(No Model.) 2 Sheets—Sheet 2.
G. F. SIMONDS.
BALL BEARING.
No. 449,959. Patented Apr. 7, 1891.
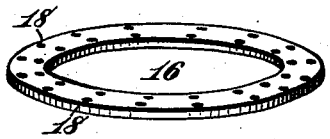
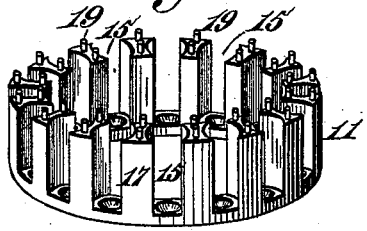
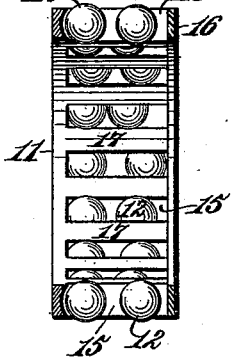
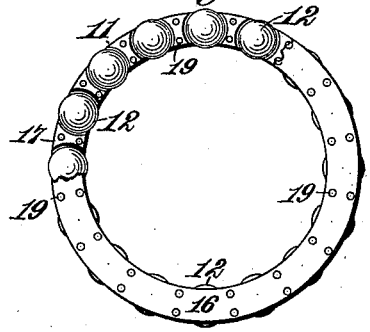
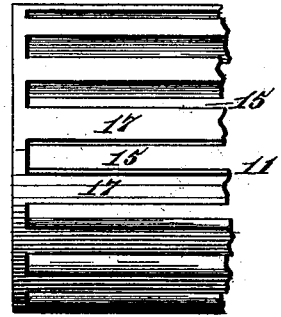
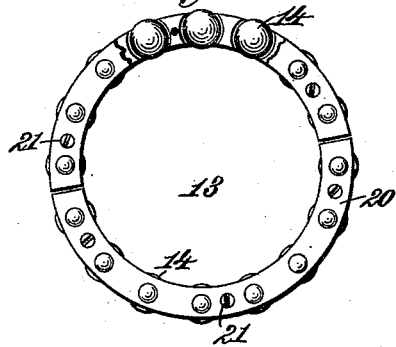
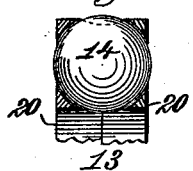
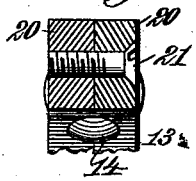
Witnesses,
Robert Everett,
J. A. Rutherford
Inventor:
George F. Simonds,
By James L. Norris.
Atty.

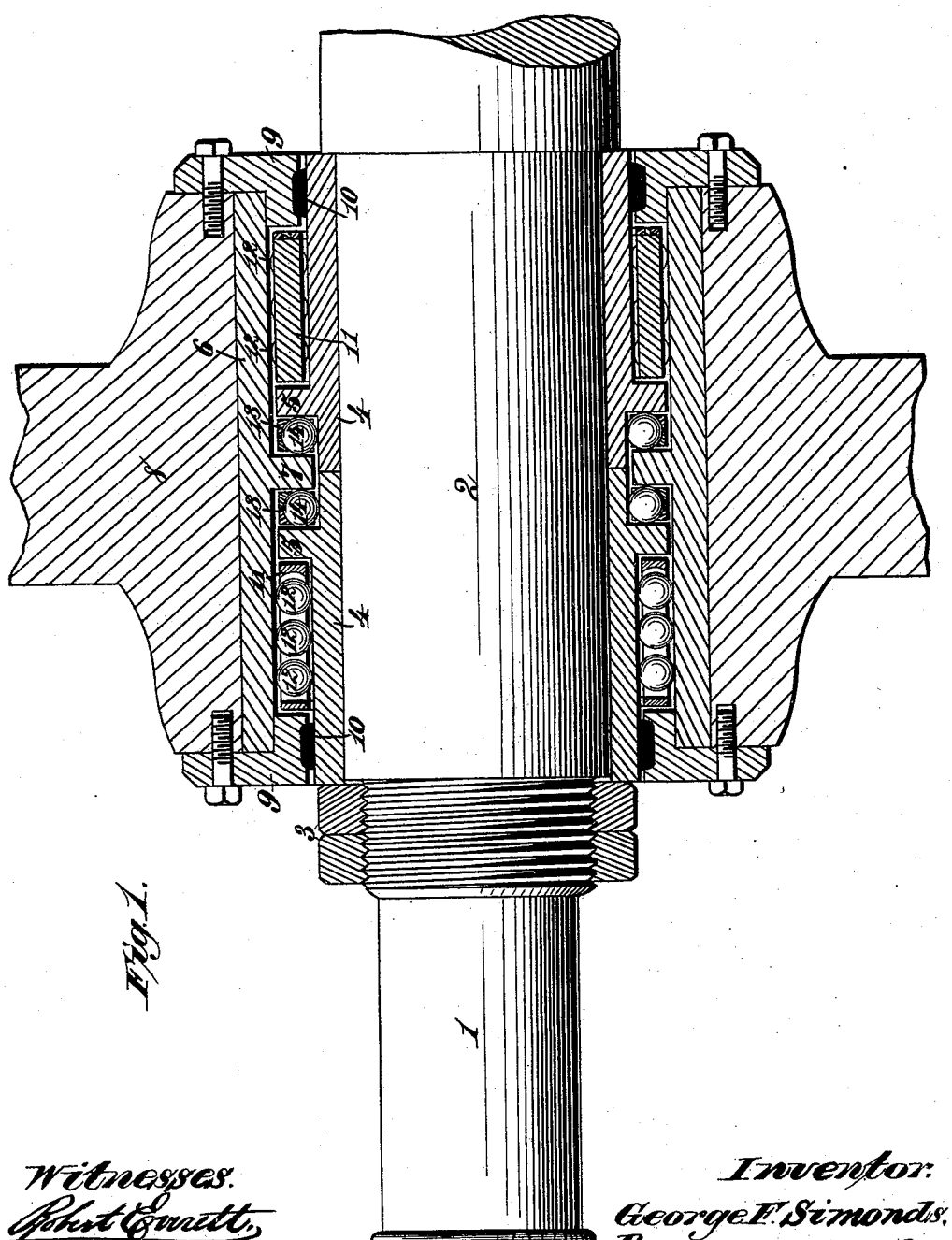

UNITED STATES PATENT OFFICE.

GEORGE F. SIMONDS, OF FITCHBURG, MASSACHUSETTS.

BALL-BEARING.

SPECIFICATION forming part of Letters Patent No. 449,959, dated April 7, 1891.

Application filed October 13, 1890. Serial No. 367,995. (No model.)

*To all whom it may concern:*

Be it known that I, GEORGE F. SIMONDS, a citizen of the United States, residing at Fitchburg, in the county of Worcester and State of Massachusetts, have invented new and useful Improvements in Ball-Bearings, of which the following is a specification.

My invention relates to bearings in which spherical rollers or balls are employed to diminish friction.

The objects of my invention are, first, to provide an improved annular cage independent of the bearing-surfaces and in which the balls for sustaining or resisting radial pressure will be retained in a body so as to be removable with the cage and capable of revolving in all directions with free lateral play, whereby they are free to move in varying lines in such a manner that all parts of the bearing-surfaces will be subject to the rolling contact of said balls and the wear and friction evenly distributed and reduced to a minimum, and, second, to provide, in combination with such caged balls for sustaining radial pressure, an annular cage for confining spherical rollers or balls to resist end pressure, and in which said balls will be free to revolve in all directions in contact with the bearing-surfaces on which they act.

In the annexed drawings, illustrating the invention, Figure 1 is a longitudinal section of a ball-bearing illustrating the application of my improved annular retaining-cages to the spherical rollers or balls for resisting radial pressure and end-thrust between a wheel or other rotary part and a shaft on which said part is mounted. Fig. 2 is a detached view of an annulus or cap for closing one end of the cage after the spherical rollers or balls have been inserted. Fig. 3 is a perspective of one form of my improved annular cage, with the end cap and the spherical rollers or balls removed, said cage being adapted for the reception of balls for resisting radial pressure. Fig. 4 is a view of the cage with one end partly broken away to expose the inclosed spherical rollers or balls, which are arranged to resist radial pressure. Fig. 5 is a transverse section of an annular cage with balls in position for supporting or resisting radial pressure. Fig. 6 is a partial view of the circumference, of a cage of the same character as shown in Figs. 3, 4, and 5, but of increased width to receive several circular series of spherical rollers or balls. Fig. 7 is a view of a single circular series of spherical rollers or balls inclosed in a cage constructed to allow the balls to protrude in four directions to take both radial pressure and end-thrust. Figs. 8 and 9 are enlarged sectional detail views of portions of the cage illustrated in Fig. 7. Fig. 10 is an enlarged sectional detail view of a portion of a cage and one ball of a single circular series of balls for resisting end-thrust only.

Referring to Fig. 1, the numeral 1 designates a shaft or axle, and 2 its spindle, on which are secured, by nuts 3 or otherwise, the abutting sleeves or rings 4, having the circumferential projections or collars 5 near their abutting ends. The abutting rings or sleeves 4 are surrounded by a sleeve 6, having an internal annular projection 7 midway between the collars 5 of the inner sleeves. The outer sleeve 6 is secured in the hub 8 of a wheel or other rotating or oscillating part, and the ends of the bearing are closed by caps 9, between which and the inner sleeves 4 are placed packing-rings 10 to exclude dust and moisture. In the spaces between the collars 5 and caps 9 are placed annular cages 11, containing spherical rollers or balls 12, that bear against and roll on the concentric surfaces of the inner and outer sleeves, to diminish friction and support or resist radial pressure, and in the spaces between the annular projections 5 and 7 of the inner and outer sleeves are placed annular cages 13, containing spherical rollers or balls 14, that bear against and roll on the parallel plane surfaces of said projections or collars 5 and 7 to resist end pressure or thrust. It will be observed that the cages 11 and 13 are independent of the bearing-surfaces against which the balls 12 and 14 act. By means of the cages 11 and 13 the balls or spherical rollers can be handled in a body with great ease, thus facilitating their attachment to and removal from machinery in a short time and without disarranging the proper operative position of the balls.

The construction of the cage 11 for receiving and retaining in place the spherical rollers or balls 12, that are to sustain or resist radial pressure only, is shown in Figs. 2, 3, 4, 5, and 6. This cage 11 is preferably made by drilling an annular series of chambers 15 in a ring or hollow cylinder of suitable metal, said chambers being extended from one side of said ring nearly to its other side, as shown in Fig. 3. The chambers 15 are open on the periphery and corresponding inner surface of the annular cage, and are closed at one end by the solid uncut portion of the cylinder and at the other end by a removable annulus or cap 16, Figs. 2, 4, and 5, which is arranged to permit the insertion and removal of the spherical rollers or balls 12 and to confine or retain them in place within the cage, so that they can be readily manipulated in a body. Between the chambers 15 are the arms or cross-pieces 17, which form the walls of said chambers and afford attachment for the annular cap 16, which is provided with orifices 18 to engage pins 19 on the ends of said arms or cross-pieces.

By referring to Figs. 1, 4, and 5 it will be seen that the spherical rollers or balls 12 protrude radially both within and without the annular cage 11 in position to bear against and roll on the inner and outer concentric surfaces of the bearing; and it will also be seen that the capacity of the chambers 15 is such as to allow the spherical rollers or balls 12 free lateral play, so that they will constantly present new bearing-surfaces, and will shift their position to roll on and bear against a more extended area of the concentric sleeves, thus reducing the liability of wear to a minimum, besides diminishing friction and sustaining the required radial pressure. The cage 11 may be of such dimensions as to hold three parallel series of balls, as shown in Fig. 1, or two parallel series of balls, as shown in Fig. 5. It is obvious, also, that it may be made to contain only one circular series of spherical rollers or balls for sustaining or resisting radial presssure; or, as illustrated in Fig. 6, its width may be increased to any desired degree to adapt it for inclosing and retaining in place a large number of balls arranged in parallel series to take radial pressure, in all of which cases the balls will be allowed free lateral play to lessen friction as much as possible.

For resisting end pressure or thrust in most situations the cage 13 will ordinarily be constructed to hold only one circular series of spherical rollers or balls 14, as shown in Fig. 1. This cage 13 may therefore consist of two correspondingly-perforated rings secured together in contact with each other, as shown in Fig. 1, and on an enlarged scale in Fig. 10, which represents a transverse section through a portion of the annular cage, with only one ball of the circular series for resisting end-thrust. The rings or half-rings 20 that compose the annular cage 13 are correspondingly perforated in a lateral direction in such a manner as to form concaved orifices that, when the rings are properly placed together, will constitute spherical chambers for inclosing the spherical rollers or balls 14, that protrude from said cage laterally in two opposite directions to take the end pressure or thrust in either direction it may be exerted. If preferred, the annular cage 13 may be perforated internally as well as laterally, in the manner shown in Figs. 1 and 10, so that while the spherical rollers or balls 14 will be in position to resist end pressure or thrust they may also roll on the shaft, axle, or sleeve that is surrounded by the cage, and thus enable the balls to support the weight of the cage and diminish or avoid any liability to wear of the parts.

In Figs. 7, 8, and 9 I have shown a form of the annular cage 13 for only one circular series of balls and in which the rings or half-rings 20 that compose said cage are perforated both externally and internally as well as laterally, so that the spherical rollers or balls 14 inclosed in said cage will protrude in four directions, two radial and two lateral, thereby enabling said balls to sustain radial pressure as well as to resist end-thrust. The rings 20 may be secured together by screw-bolts 21, as shown in Figs. 7 and 9, or in any other convenient manner. As shown in Fig. 7, the cage may be made in partly annular sections to facilitate its insertion in and removal from a ball-bearing in some situations; but this feature I do not claim in this application, as it is described and claimed in an application, Serial No. 376,287, filed by me December 30, 1890. By the construction of annular cage and the arrangement of spherical rollers or balls therein, as illustrated in Figs. 7 and 8, in which the cage is perforated both internally and externally, as well as laterally, the device is adapted with but slight expense to a wide range of uses where it is desirable to counteract the effects of both radial and end pressure within a comparatively small space.

The cages which I use for holding and retaining balls for resisting both radial pressure and end-thrust are made to carry the balls and the balls carry the cages and the cages move at different velocities and quite independent of the resisting-surfaces against which the balls operate.

In other applications I have shown, described, and claimed various ways of constructing and arranging cages for receiving and retaining balls to resist radial pressure and end-thrust, either separately or together.

In the application, Serial No. 376,288, filed by me December 30, 1890, I have shown, described, and claimed a ball-bearing comprising balls surrounding a shaft or axle and confined in a removable cage and adapted to sustain radial pressure and other balls surrounding the shaft or axle and confined in a removable cage and adapted to resist end-thrust, said balls for resisting radial pressure and end-thrust, respectively, being arranged in different planes and on different diameters between concentric bearing-surfaces and parallel vertical plane bearing-surfaces; and this therefore I do not herein specifically claim.

Having thus described my invention, what I claim is—

1. In a ball-bearing, the combination, with spherical rollers or balls, of a removable annular cage in which the balls are retained in a body and in which they have free lateral play and are capable of revolving in all directions, said cage being independent of the bearing-surfaces, against which the balls act and between which said cage is adapted to move, whereby the said balls are free to move in varying lines, so that all parts of the bearing-surfaces will be subject to the rolling contact of said balls and the wear and friction distributed, substantially as described.

2. In a ball-bearing, the combination of spherical rollers or balls for sustaining or resisting radial pressure, a removable annular cage in which said balls are retained in a body and in which they are capable of revolving in all directions in contact with concentric bearing-surfaces, spherical rollers or balls for resisting end-thrust, and a removable annular cage in which said last-named balls are retained in a body and in which they are capable of revolving in all directions in contact with parallel plane bearing-surfaces, said cages being independent of the bearing-surfaces against which the balls act, substantially as described.

In testimony whereof I have affixed my signature in presence of two witnesses.

GEO. F. SIMONDS.

Witnesses:
 EWELL A. DICK,
 JAMES A. RUTHERFORD.